United States Patent [19]

Ady

[11] Patent Number: 5,445,551
[45] Date of Patent: Aug. 29, 1995

[54] WILD GAME CALL

[76] Inventor: Daniel D. Ady, 417 S. KCID Rd., Caldwell, Id. 83605

[21] Appl. No.: 188,254

[22] Filed: Jan. 28, 1994

[51] Int. Cl.$^6$ ............................................. A63H 5/00
[52] U.S. Cl. ..................................................... 446/209
[58] Field of Search .................. 446/202, 204, 206–209

[56] References Cited

U.S. PATENT DOCUMENTS

| | | | |
|---|---|---|---|
| 4,637,154 | 1/1987 | Laubach | 446/207 X |
| 4,764,145 | 8/1988 | Kirby | 446/208 |
| 4,976,648 | 12/1990 | Meline | 446/207 |

*Primary Examiner*—Mickey Yu
*Attorney, Agent, or Firm*—Ken J. Pedersen; Barbara S. Pedersen

[57] ABSTRACT

The invention is a wild game call mouthpiece of generally tubular form with a generally rectangular lip extending out from its cylindrical surface at its inlet end. The lip has lateral edges which transition into the tubular body near the inlet opening. In the central region of the lip, beginning from its distal end and continuing towards its proximal end, is a groove which extends generally midway to the lateral edges, and which becomes more pronounced near the inlet opening of the call. Then, past the zone where the lip transitions into the tubular body, is a curved, hollowed-out zone which creates the beginning of a resonating chamber which extends back through the center of the tubular body. An elastic plastic sleeve is inserted over the extended portion of the lip to create a resonating reed which can be activated by a sportsman blowing into the inlet of the call.

3 Claims, 3 Drawing Sheets

WILD GAME CALL

BACKGROUND OF THE INVENTION

1. Technical Field

This invention relates generally to animal calls used by hunters to attract wild game. More specifically, this invention relates to a game call for elk or other wild game wherein a plastic membrane, called a "reed", is placed over the lip of a mouthpiece to provide a vibrating surface for assisting the hunter in modulating the tone and volume from the call.

2. Background Art.

In the pursuit of large wild game, such as elk, for example, it is highly advantageous to use a call to simulate the various sounds emitted by the animal. This way, the animal may be enticed to come to the hunter. This is particularly so when hunting with a bow or camera and stalking game for short range contact. As elk and other large game animals make a wide array of sounds or calls, it is important that not only the simulation be a true one but that the hunter be able to render several different calls.

U.S. Pat. No. 4,764,145 (Kirby) discloses a wildlife call having a tube with a mouthpiece on one end with an arched tipped head partly covered by a resonating membrane reed.

U.S. Pat. No. 4,976,648 (Meline) discloses an elk call having a tube with a mouthpiece on one end, the mouthpiece having an elliptical air inlet partly covered by an elastic sheet which constitutes a reed; and a backing plate located at the inlet end with a plate tongue offset below the plastic sheet.

Still, there is a need for a simple, economical wild game call which enables the sportsman to truly simulate a wide array of animal calls.

DISCLOSURE OF INVENTION

The invention is a wild game call mouthpiece of generally tubular form with a lip extending out from approximately one-half of its cylindrical surface at the mouth end of the call. The lip extends out from the cylindrical surface at an angle of between about 30°–60° from the centerline of the cylindrical surface. The lip is generally plate-like, although it may have a slight curvature in the same general direction, but generally not as pronounced as, the curvature in the outer cylindrical surface of the call to define inside and outside surfaces of the lip. Preferably, the curvature in the inside surface of the lip is slightly more pronounced than the curvature in the outside surface, creating a slight "dished" effect in the inside surface and the lip.

The lip is slightly greater in width at its distal end than at its proximal end, and preferably it has a slightly exaggerated edge at its distal end. The side or lateral edges of the lip may transition from its proximal end to its distal end in angular fashion, or in smooth curves. Smooth curve transitions are shown in the figures. When done in the angular fashion, there are some sharper side edges on the lip for more securely receiving and engaging the thin band of latex which is stretched around the central portion of the lip to provide a vibrating surface, like a reed, there.

The lip, reed and mouth end of the call are adapted to receive and cooperate with the lips and mouth of the sportsman to assist the sportsman in modulating the tone and volume from the call. At the mouth end of the call, there is a flat lip guide area immediately below the inlet opening opposite the lip. The lip, then, extends out over the inlet opening and out over the flat lip guide.

In the central region of the inside surface of the lip, beginning from near the distal end and continuing towards the proximal end, is a depression, generally midway from the side edges of the lip. The depth of the depression increases from the distal end to the proximal end of the lip. At the distal end, the depression may be very shallow and unremarkable. At the proximal end, the depression becomes significantly more pronounced. At the inlet opening of the call, where the lip transitions into the tubular call body, the depression has a significantly notched entrance into the inside hollow volume of the call.

The inside volume of the call is a resonating chamber which extends back through the center of the tubular call body. The resonating chamber has a first, anterior portion of generally spherical shape separated by a restriction orifice from a second, posterior portion of firstly generally conical and then secondly generally cylindrical shape.

BEST MODE FOR CARRYING OUT INVENTION

Referring to the Figures, there is depicted one preferred embodiment of the wild game call 10 of the invention. The call is held on or near its hand end 11 by the sportsman using the call who puts the call's mouth end 12 in his mouth and blows to activate the call.

Figure 1:
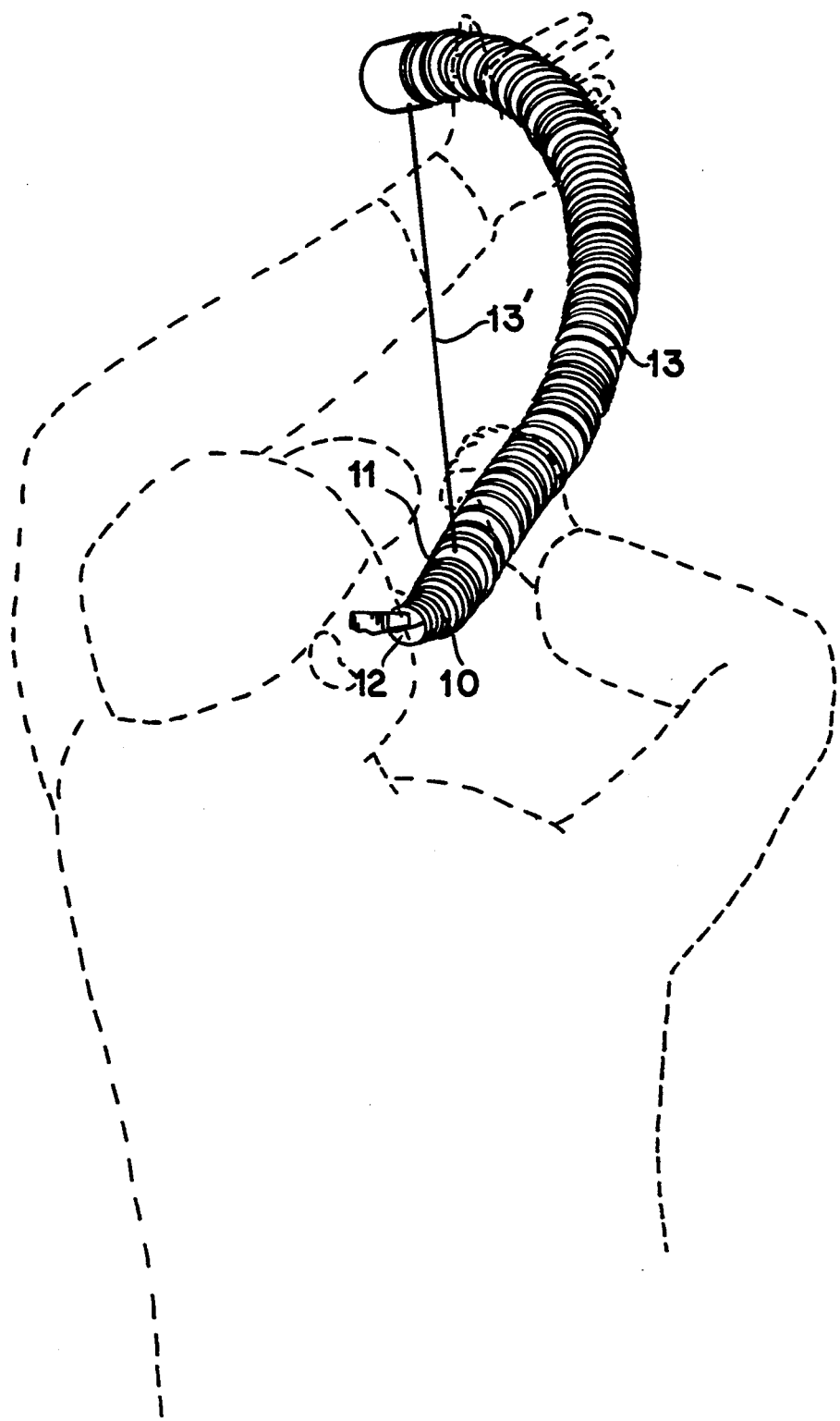
FIG. 1 is a perspective view of one embodiment of the invention inserted in a megaphone tube and being used by a sportsman.
Figure 2:
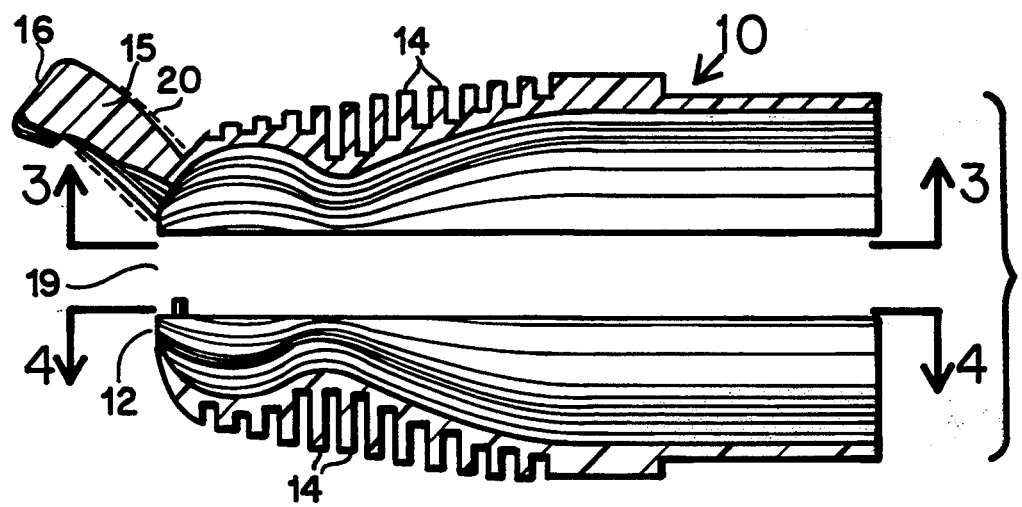
FIG. 2 is a side, slightly exploded, cross-sectional view of one embodiment of the invention.
Figure 3:
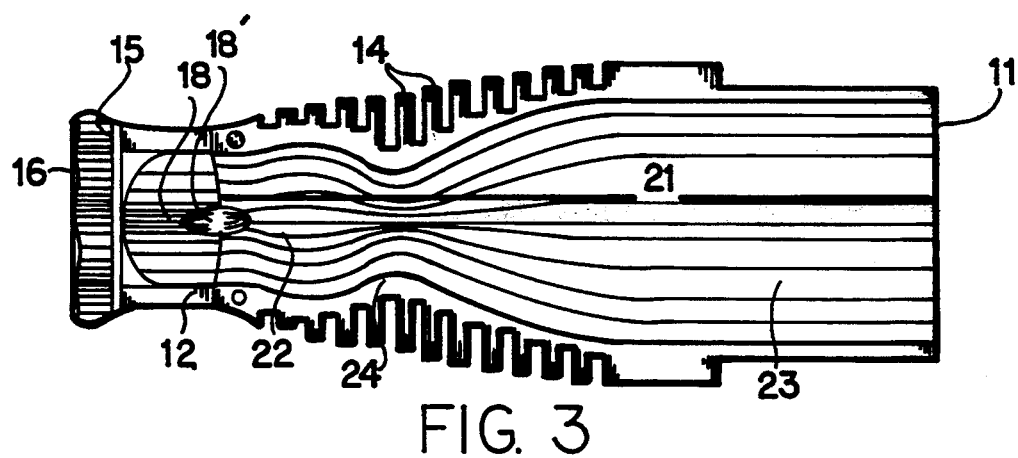
FIG. 3 is a bottom, cross-sectional view from the location of line 3—3 in FIG. 2.
Figure 4:
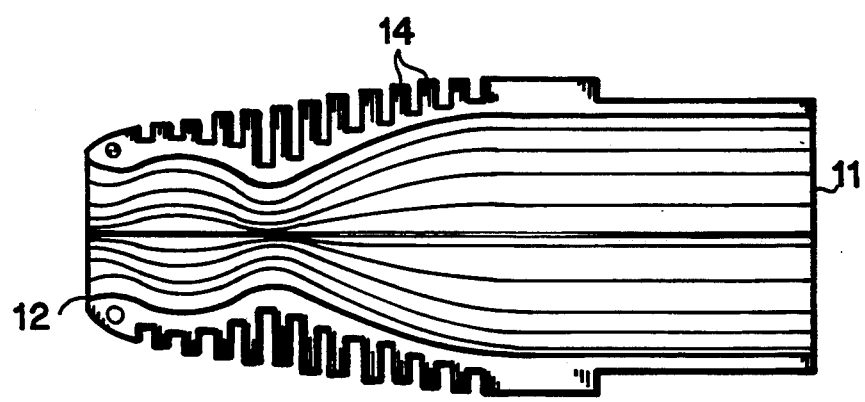
FIG. 4 is a top, cross-sectional view from the location of line 4—4 in FIG. 2.
Figure 5:
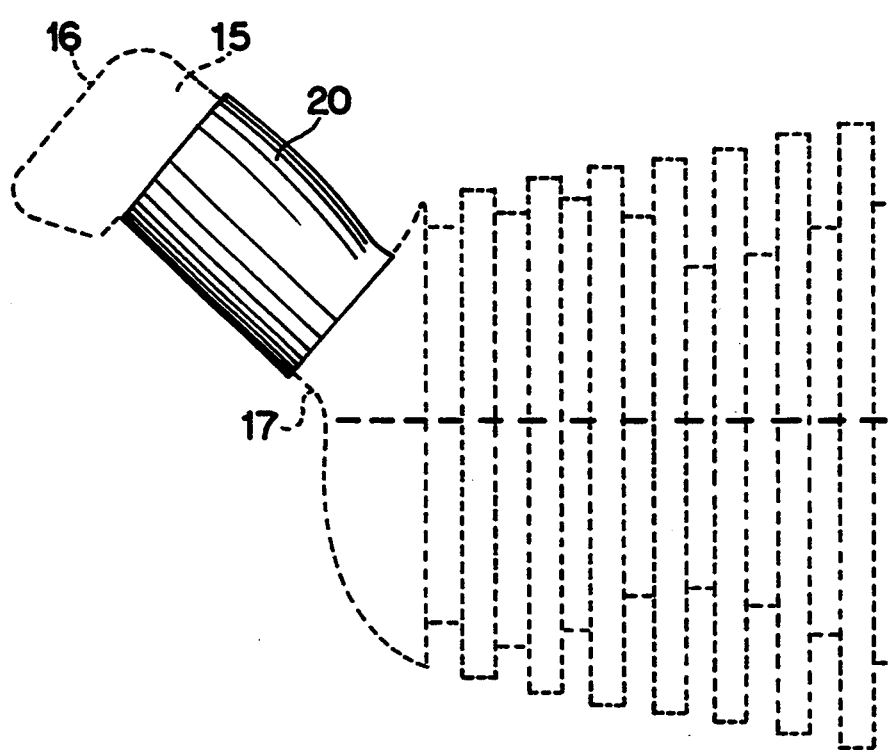
FIG. 5 is a side, partial detail view of one embodiment of the invention with a thin band of latex stretched around the lip at the mouth end.

Hand end 11 may be inserted in a long flexible megaphone tube 13 as depicted in FIG. 1. Tube 13 has a cord 13' extending from near call 10 to the other end of the tube so that the tube may be bent by pulling on cord 13'. This way, the direction, for example, of sound from the call 10 may be adjusted to confuse or fool the called animal. Also, megaphone tube 13 may also impart its own adjustment to the tone and volume of the sound from call 10.

Call 10 is of generally hollow cylindrical, or tubular form. Preferably, it is made in two pieces by injection molding of an ABS resin. It may have a series of ridges 14 on its outer surface to improve its handling and aesthetic characteristics. Also, at its mouth end 12, call 10 has lip 15 extending out from approximately one-half of its cylindrical surface.. Lip 15 extends out at an angle of between about 30°–60° from the centerline of call 10 beginning at just above center in the mouth end 12. Lip 15 continues in a direction away from the centerline and away from the mouth end 12 of the call 10.

Lip 15 is about $\frac{3}{4}$ of an inch long, about 1 inch wide at its distal end 16, about 1 inch wide at its proximal end 17, and about $\frac{1}{8}$ of an inch thick at its proximal end 17, when the call 10 is about $4\frac{1}{2}''$ long from the distal end 16 of lip 15 to the end of the hand end 11.

Lip 15, when it transitions from its proximal end to its distal end in angular fashion, may do so in discrete steps. This is to say that lip 15 may get progressively wider in discrete, wider steps.

In the central region of the inside surface of lip 15 is a depression 18. At near the distal end 16 of lip 15, depression 18 may be quite shallow, even unremarkable. Near the proximal end 17 of lip 15, however, depression 18 becomes significantly more pronounced. Near the mouth end 12 of call 10 at inlet opening 19, depression 18 has a significantly notched entrance 18, into the inside volume of call 10. Depression 18 may be angular, as in a rectangular or stepped notch, or smooth, as in a gradual pressed-in area.

Wrapped snugly around lip 15 is a thin band of latex, reed 20. Reed 20 may be made, for example, by cutting cross-wise the fingers of a latex rubber glove into approximately ½ of an inch long sections. One of these sections may then be slipped over lip 15, and adjusted to fit snugly between the exaggerated end edge at the distal end 16, and the mouth end 12 of call 10 at the proximal end 17. There must be enough tension in reed 20 to keep it stretched enough so that its inner surface, when the call 10 is not in use, covers the inside surface of lip 15, but does not sag and touch the surface of groove 18 at the proximal end 17 of lip 15.

Inside tubular call 10 is a resonating chamber 21 which extends from the mouth end 12 to the hand end 11 of call 10. Resonating chamber 21 has first, anterior back-pressure portion 22, and second, posterior sounding portion 23. Back pressure portion 22 is of generally spherical shape, and is molded after the "bulb" in the throat of a bull elk. Between back pressure portion 22 and sounding portion 23 is restriction orifice 24. Restriction orifice 24 acts to impede the air flow through the center of the body of call 10. This way, it creates back pressure in the first portion 22 of the resonating chamber 21. This back pressure exists at the inlet opening 19 and even between the inside surface of reed 20 and the inside surface of lip 15, keeping reed 20 entry from the surface of canal 18, even when considerable pressure is exerted on reed 20 when lip 15 and the mouth end 12 of call 10 are blown on hard by the sportsman.

In use, the sportsman places lip 15 in his mouth, with the outside surface of lip 15 and reed 20 in contact with the sportsman's upper lip. Then, the sportsman blows into or inhales from inlet opening 19 to create a flow of air over the reed 20 in the region of canal 18, causing the reed 20 to vibrate and create the sound from the call. The volume of the sound from the call may be adjusted by providing an optional, adjustable throttling means, like a butterfly valve, for example, in addition to or instead of, the restriction orifice 24.

While there is shown and described the present preferred embodiment of the invention, it is to be distinctly understood that this invention is not limited thereto but may be variously embodied to practice within the scope of the following claims.

I claim:
1. A wild game call comprising:
   a generally tubular body with generally cylindrical outer surfaces and a hollow inside volume, said tubular body having an inlet end and an outlet end;
   a generally rectangular, slightly curved lip member, with lateral edges and a front edge, said lip member extending outwardly from the inlet end of the tubular body's cylindrical outer surface to form a slightly curved plate, said plate transitioning into the cylindrical outer surface of the call near the center of the inlet end;
   a curved, inside surface of said slightly curved plate, with a distal end and a proximal end, the inside surface having a depression beginning at near its distal end and continuing to its proximal end, the depression being deeper and more pronounced at the proximal end of said curved plate;
   notched entrance into the inside hollow volume of the call located at where the center of the proximal end of said curved, inside surface of the plate meets the inlet end of said tubular body; and
   an elastic, plastic sleeve inserted over the lateral edges of the lip, and covering the inside surface of the curved plate, but not touching the depression surface at the proximal end of the plate.
2. The game call of claim 1, wherein the hollow inside volume is a resonating chamber having:
   a first, anterior portion of generally spherical shape,
   a second, posterior portion of firstly generally conical and then secondly generally cylindrical shape, and
   a restriction orifice separating the said first, anterior portion and the said second, posterior portion.
3. The game call of claim 1, wherein the depression comprises a gradual pressed-in area.

* * * * *